United States Patent [19]

Wilterding et al.

[11] 4,288,857
[45] Sep. 8, 1981

[54] DIGITAL INTEGRATING/AUTO-CORRELATOR APPARATUS

[75] Inventors: Jack E. Wilterding, Aurora; John J. Cozzens, Lakewood, both of Colo.

[73] Assignee: The United States of America as represented by the Secretary of the Air Force, Washington, D.C.

[21] Appl. No.: 123,334

[22] Filed: Feb. 21, 1980

[51] Int. Cl.³ .................. G06F 15/336; G01S 9/42
[52] U.S. Cl. .................. 364/728; 343/100 CL; 364/517; 364/724
[58] Field of Search .............. 364/517, 553, 724, 728, 364/733, 819; 343/5 CE, 100 CL

[56] References Cited

U.S. PATENT DOCUMENTS

| | | | |
|---|---|---|---|
| 3,204,119 | 8/1965 | Gray | 364/517 X |
| 3,576,564 | 4/1971 | Galvin | 343/5 CE X |
| 3,646,333 | 2/1972 | Pryor, Jr. | 364/728 |
| 3,925,650 | 12/1975 | Brown | 364/517 X |
| 4,028,697 | 6/1977 | Albanese et al. | 343/100 CL X |

*Primary Examiner*—Jerry Smith
*Attorney, Agent, or Firm*—Donald J. Singer; William Stepanishen

[57] ABSTRACT

A digital integrating auto-correlator apparatus utilizing a digital integrator in conjunction with an auto correlator unit for signal enhancement of two analog signals one of which is noise only and the other containing the signal plus noise.

8 Claims, 4 Drawing Figures

DIGITAL INTEGRATING/AUTO-CORRELATOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a signal to noise ratio enhancement apparatus, and in particular to a digital integrating/auto-correlator apparatus.

In the prior art, various circuit arrangements have been utilized for improving signal detectability, especially in the presence of interfering noise or clutter signals. Moving target discriminating systems provide a greater degree of improvement in the signal-to-interference ratio by efficiently diminishing the effects of clutter signals which are caused by stationary reflectors, such as the earth's surface. The use of non-adaptive radar signal processors provide an acceptable clutter rejection for particular ranges and for particular types of clutter, but the performance of such systems degrades in an environment in which the clutter conditions are varying. Furthermore, when interfering clutter is not present, the conventional prior art non-adaptive processors are not generally optimum in the presence of ordinary electrical noise alone.

Matched filter signal processors have also provided a means for diminishing the effects of interfering clutter. However, many of these devices have not proven to achieve useful results under dynamically changing clutter conditions and in all range sectors. The defective results occur mainly in matched filter operation upon the echo returns from multiple-pulse burst transmission radar system. The matched filter processors fail to give the required signal interference cancellation. For example, when the target of interest lies in particular periods of the several interpulse periods of the multi-pulse burst, accurate cancellation does not occur. The results are randomly selective in that only in other particular interpulse periods may an acceptable signal-to-interference ratio be achieved. Thus, the total effect is the ultimate addition of the individual returns from a multiple-pulse burst to yield an output having a degraded signal-to-interference ratio.

SUMMARY OF THE INVENTION

The present invention utilizes a digital integrating-/auto-correlator in which integration and auto-correlation are performed digitally and automatically in near real time. A signal containing noise and a reference noise signal are separately coupled to and are alternately coupled through an analog switch. A low pass filter, sample and hold circuit, and analog to digital (A/D) converter convert the alternating-applied signal to digital form prior to application to the digital integrating/auto-correlator processing unit. The digital integrating/auto-correlator processor comprises an arithmetic logic unit (ALU), an accumulator, and an output latch. The digital values from the signal channel are added to the accumulator, and the digital values from the reference channel are subtracted from the accumulator. After the output of the accumulator is integrated by the ALU, the contents of the accumulator are clocked into the output latch. The output signal represents the difference of the applied signal plus noise and the noise only signal. After 256 adds, the reference channel is selected and the process continues, only this time 256 samples of the digital value are subtracted from the accumulator. The DI/AC output is 16 bits, however, by looking at only the upper 8 bits, it may be seen that the output has been divided by 256. The output which is the difference of two integrals (time averages) is an auto-correlation. It is one object of the present invention, therefore to provide an improved digital integrating/auto-correlator apparatus.

It is another object of the invention to provide an improved digital integrating/auto-correlator apparatus to digitally integrate and auto-correlate a signal in a noise environment.

It is another object of the invention to provide an improved digital integrating/auto-correlator apparatus wherein the processing occurs automatically and in near real time.

It is still another object of the invention to provide an improved digital integrating/auto-correlator apparatus wherein the signal to noise ratio of an applied analog signal is enhanced digitally.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
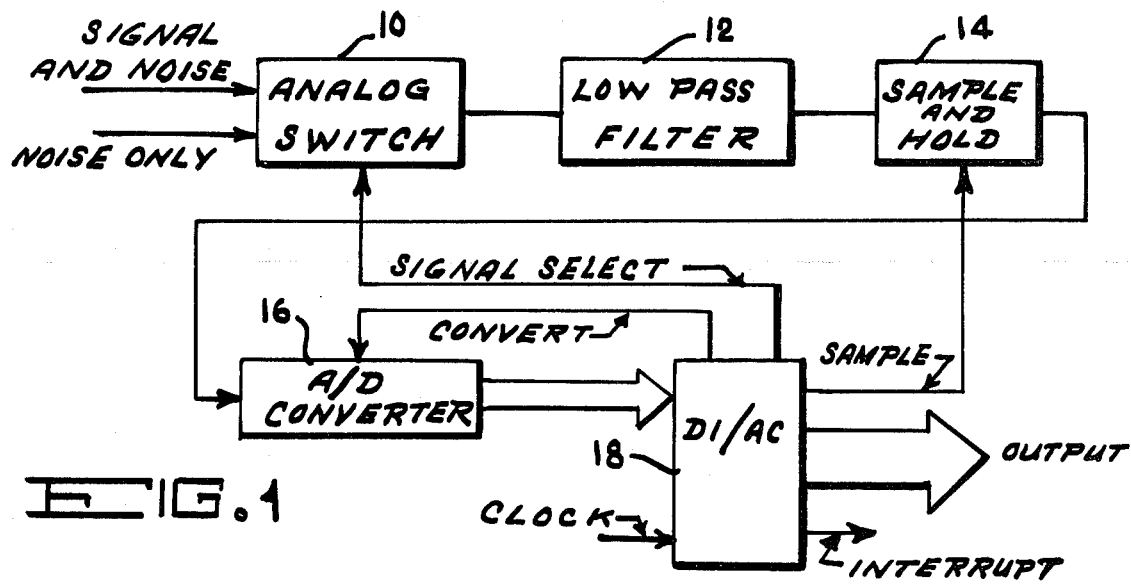
FIG. 1 is a block diagram of the digital integrating-/auto-correlator apparatus in a signal enhancement configuration in accordance with the present invention.

Referring now to FIG. 1, there is shown a block diagram of the digital integrating/auto-correlator apparatus in a circuit configuration for signal enhancement. The analog switch 10 receives both a signal plus noise input and a noise only input. The output of the analog switch 10 is applied through a low pass filter unit 12 to a sample and hold unit 14. The output from the sample and hold unit 14 is applied to an A/D converter unit 16 wherein the analog input signal is converted to a digital signal comprising 8 bits. The digital integrating/auto-correlator apparatus 18 receives the digital signal from the A/D converter 16 and accumulates a predetermined number of bits for each of the signal plus noise channel and the noise only channel. The digital integrating-/auto-correlator (DI/AC) apparatus 18 which receives a clock signal for its internal timing, provides a convert signal to the A/D converter 16, a signal select signal to the analog switch unit 10, and a sample signal to the sample and hold unit 14. The output signal from the DI/AC apparatus 18 is a 16 bit digital signal.

The present circuit operates in the following manner. At the input to the analog switch unit 10 there are two input signals that are available, one containing signal plus noise which is called the signal channel, and the other noise only which is called the reference channel.

The analog switch 10 is used to select either the signal channel or the reference channel. Prior to the operation of the circuit, the two input channels may be adjusted to produce a zero difference with no signal present. In the present example, the signal channel is selected first by the signal select signal from the DI/AC unit 18 which is applied to the analog switch unit 10. The analog switch 10 is followed by a single pole low pass filter 12 which insures that the sampled output is a true representation of the input. This signal channel input is sampled by the sample and hold circuit 14 which produces a time invariant input to the analog to digital (A/D) converter 16. Once the A to D conversion takes place, the samples are converted to digital format and added into an accumulator in the DI/AC apparatus 18. After $2^N$ or 256 adds, the reference channel is selected by the DI/AC apparatus 18. Now the DI/AC apparatus 18 receives $2^N$ or 256 samples of the reference channel (the noise only input), however the digital value of the reference channel is subtracted from the accumulator. The DI/AC output is 16 bits but if only the upper 8 bits are looked at, it may be seen that a division by $2^N$ or 256 has occurred. The output is therefore the difference of two integrals (time averages) which is also known as autocorrelation.

Figure 2:
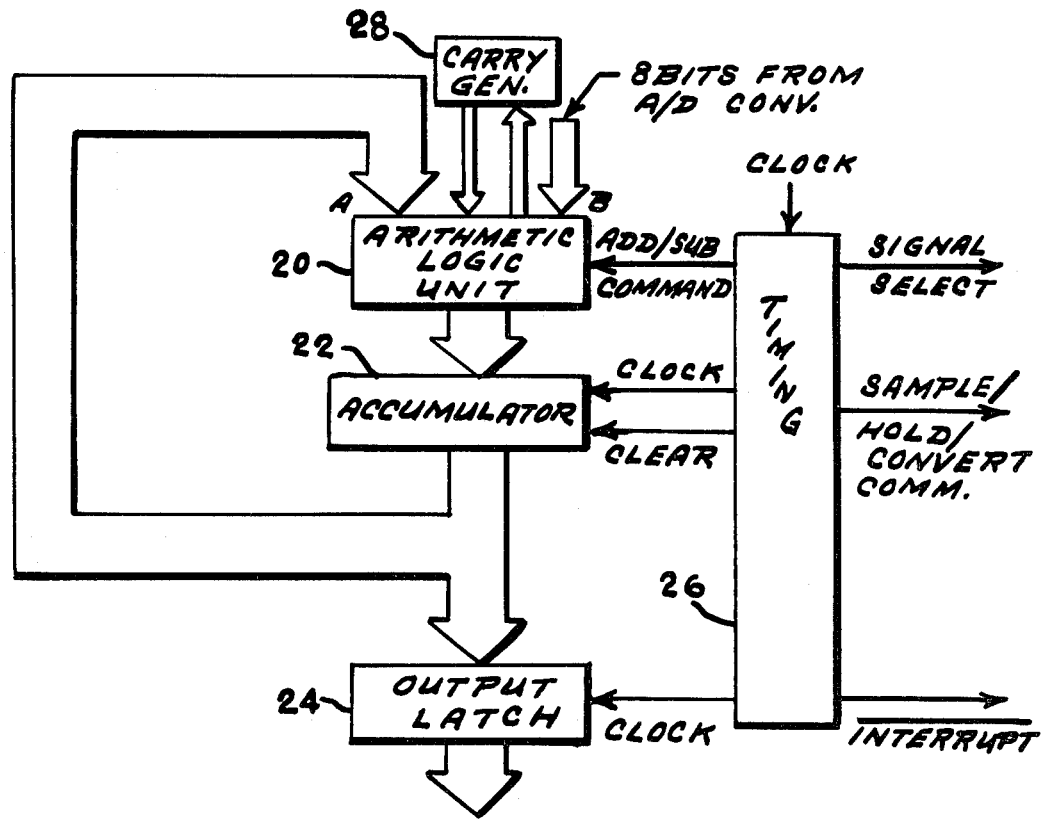
FIG. 2 is a block diagram of the digital integrating-/auto-correlator apparatus.

Turning now to FIG. 2, there is shown a block diagram of the digital integrating/auto-correlator apparatus which comprises an arithmetic logic unit (ALU) 20, an accumulator 22, an output latch unit 24, a timing unit 26 and a carry generator unit 28. The 8 bit digital signal from the A/D converter is received at the arithmetic logic unit 20 for processing and then transferred to the accumulator 22 for storage. The timing unit 26 which receives a clock signal provides the internal timing and command signals for the DI/AC unit itself as well as the external control signals referred to in FIG. 1. The carry generator 28 is connected to receive bits from and apply bits to the ALU 20. The accumulator 22 is connected to an output latch unit 24 from which the output signal of the digital integrating/auto-correlator apparatus is obtained.

The digital integrating/auto-correlator apparatus shown in FIG. 2 operates in the following manner. The eight bit A to D output is fed into the B input of the arithmetic logic unit 20 which comprises four 74181 ALU circuits and a 74182 carry generator. The ALU 20 has no storage capacity, therefore the results of the arithmetic operation are stored in the 16 bit accumulator 22. The digital integration is achieved when the accumulator output is fed back to the A input to the ALU 20. The integration period for this circuit has been set at $2^{N+1}$ or 512 samples ($2^N$ or 256 adds and $2^N$ or 256 subtracts). When these 512 operations are complete, the accumulator contents are clocked into the output latch 24, the accumulator 22 is cleared, and an interrupt signal is generated by the timing unit 26. The interrupt signal output is utilized to inform the micro-processor that another integrated and auto-correlated result is ready for processing.

The DI/AC apparatus can perform at a rate of 10 samples per micro-second. The circuit speed is, therefore, limited only by the A to D converter, which can still produce outputs faster than a micro-processor could handle them. Thus, the DI/AC, apparatus performs the integration and auto-correlation function automatically, producing an output and an interrupt to the micro-processor. The micro-processor can accept the input and go on about its processing tasks while the DI/AC apparatus is working on the next integration period.

Figure 3:
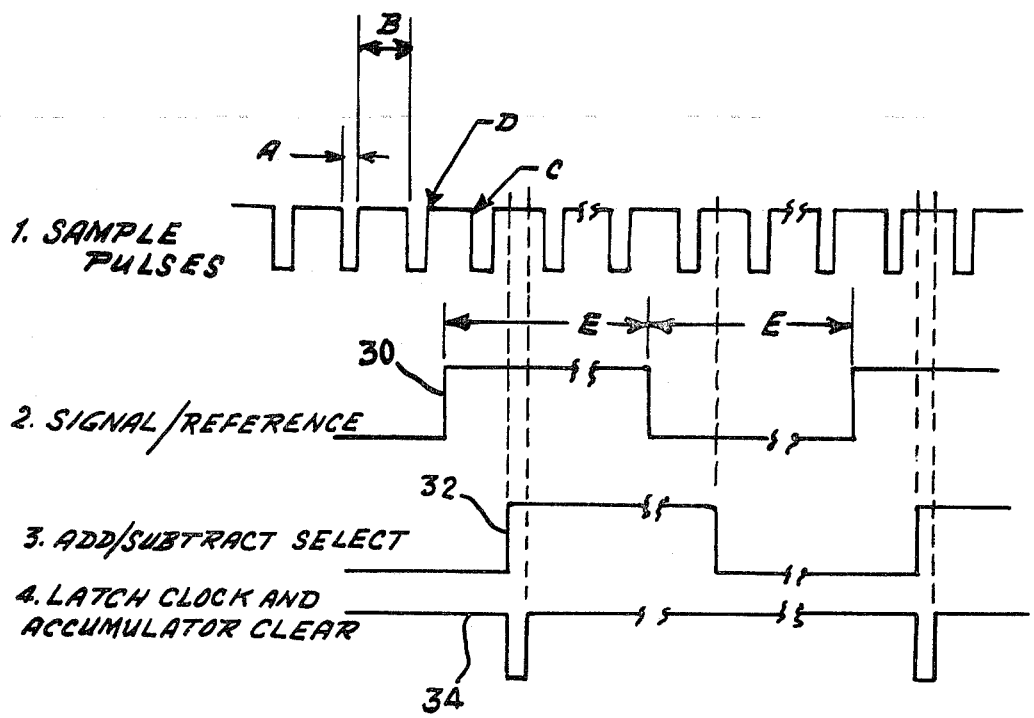
FIG. 3 is a graphical representation of the timing signals that are utilized on the present invention and FIG. 4 is a graphical representation of the attenuation characteristics of the digital integrating/auto-correlator apparatus.

The timing diagram in FIG. 3 shows the timing signals and their relationships to the signals that are generated in the timing unit 26 of FIG. 2. The wave shapes shown herein control the DI/AC apparatus. The sample pulses have a sample period as shown by A and a hold period as given by B. The hold period must be long enough for the A/D conversion plus the ALU propagation delay. The sample pulse waveform is applied to the sample and hold circuit and is inverted to provide the convert command to the A/D converter and the accumulator clock. The sampling takes place while the signal is low. The inverted falling edge clocks the ALU output into the accumulator and is illustrated by C. The inverted rising edge starts the A/D conversion process and is illustrated by D. The signal/reference waveform 30 allows $2^N$(256) sample pulses for each polarity. The character E defines the interval that represents $2^N$(256) samples. While waveform 30 is high the signal channel is selected and when it is low, the reference input is selected. The add/subtract select waveform 32 is used to instruct the ALU to add or subtract. It may be noted that it is the same shape as waveform 30 only it is delayed to allow for conversion time and ALU processing. The latch clock and accumulator clear waveform 34 is the clear signal for the accumulator. When this signal is inverted, it unloads the results of the last 512 operations into the output latch. This same waveform is used to provide the micro-processor interrupt signal. If only an eight bit output word is desired, waveform 34 may be used to set the round-off flip-flop. Thus, it may be seen that the DI/AC output is the difference of two summations. Since the minuend is noise plus a signal, the subtrahend is exclusively noise, the difference must be signal only.

Figure 4:
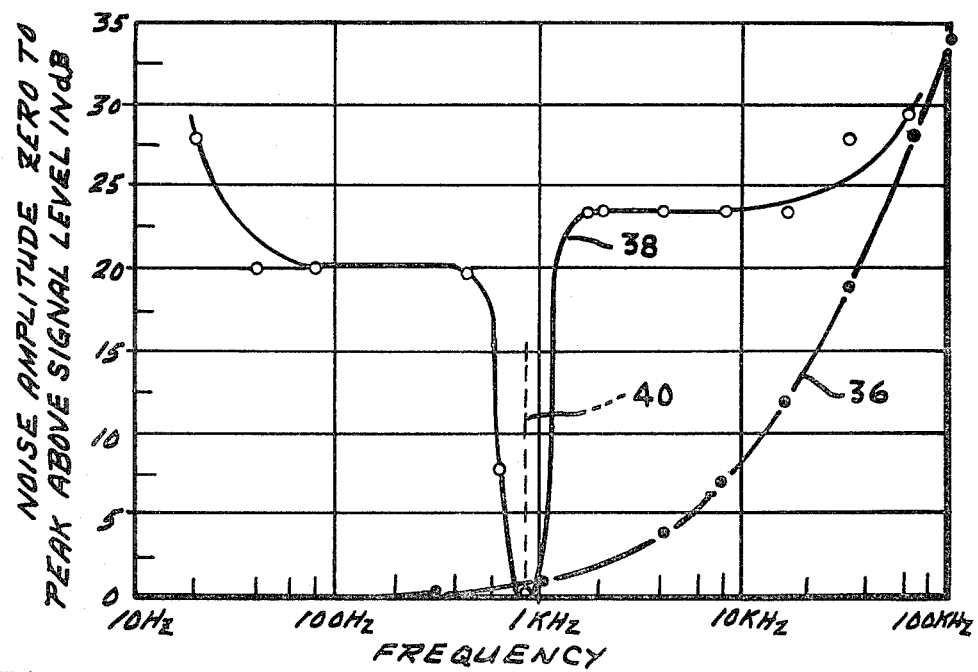

There is shown in FIG. 4, the test results of a specific system wherein a sample pulse one micro-second wide, at a rate of 250 KHz was used. The switching transients which occurred when the input was changed from signal to reference, required that sampling be delayed approximately 64 micro-seconds after each switching change. This resulted in a signal/reference switching frequency of approximately 860 Hertz. The noise attenuation characteristics of the input RC filter and the total circuit are both shown for comparison. The attenuation characteristic curve of the input RC filter is labelled 36. The attenuation characteristic curve of the total system (filter and the DI/AC apparatus) is labelled 38. The signal/reference switching frequency which is 860 Hz is shown by the dashed line 40. The measurement criteria was the noise amplitude (zero to peak) at the input to the RC filter, which caused the DI/AC output to shift one bit. This is equivalent to a change in signal of 10 milli-volts. The ratio of the measured noise to 10 milli-volts was converted to decibels and plotted.

The DI/AC apparatus may be used wherever an attempt is being made to extract low level DC information from a signal in a high noise environment. The present test system involves measuring RF energy absorption. The present invention may be easily applied to a system which is measuring small light signals in an environment of high ambient light, or to measure an audio tone in a high noise environment.

Although the invention has been described with reference to a particular embodiment, it will be understood to those skilled in the art that the invention is capable of a variety of alternative embodiments within the spirit and scope of the appended claims.

What is claimed is:

1. A digital integrating/auto-correlator apparatus comprising in combination:

switching means for receiving a first and second signal, a filter means for receiving the output from said switching means, said filter means providing a filtered output signal, a sample and hold means connected to said filter means to receive said filtered output signal, said sample and hold means receiving a sample control signal, said sample and hold means providing a time invariant output signal, an A/D converter means connected to said sample and hold means to receive said output signal therefrom, said A/D converter means receiving a convert control signal, said A/D converter means providing a digital output signal, and, a digital integrating/auto-correlator means receiving said digital output signal from said A/D converter means, said digital integrating/auto-correlator means receiving an externally generated clock signal for synchronizing signal processing within itself, said digital integrating/auto correlator means generating a signal select control signal which is applied to said switching means to switch either of said first or second signal to the output of said switching means, said digital integrating/auto-correlator means also generating a sample control signal to establish the sampling period within said sample and hold means and a convert control signal to establish the A/D conversion period within said A/D converter means, said digital integrating-/auto-correlator means digitally integrating and correlating said digital output signal to provide a digitally correlated output signal.

2. A digital integrating/auto-correlator apparatus as described in claim 1 wherein said digital intergrating-/auto-correlator means comprises in combination:

a timing means for receiving said clock signal, said timing means generating said signal select control signal, said sample control signal and said convert control signal, said timing means also generating an internal clock signal, an add/sub command signal and a clear signal, an arithmetic logic means for receiving the digital output signal from said A/D converter means, said arithmetic logic means including a four bit carry generator, said arithmetic logic means receiving said add/sub command signal from said timing means, said arithmetic logic means receiving a feedback signal, said arithmetic logic means processing said digital output signal and said feedback signal in response to said add/sub command signal, said arithmetic logic means providing a computation output, an accumulator means receiving said computation output, said accumulator means storing said computation output, said accumulator means providing said feedback signal to said arithmetic logic means, said accumulator means receiving said clock and said clear signal from said timing means, and an output latch means connected to said accumulator means to receive the output therefrom, said accumulator means having its output clocked into said output latch means upon the completion of a predetermined number of arithmetic operations by said arithmetic logic means, said accumulator means being cleared upon the transfer of its output to said output latch means, said output latch means receiving said clock signal from said timing means, said output latch means providing an auto-correlated output signal in response to said clock signal.

3. A digital integrating/auto-correlator apparatus as described in claim 2 wherein said arithmetic logic means has an integration period of $2^{N+1}$ samples, where N is the number of bits of the particular A/D converter used.

4. A digital integrating/auto-correlator apparatus as described in claim 5 wherein said $2^{N+1}$ samples comprise $2^N$ adds and $2^N$ subtracts.

5. A digital integrating/auto-correlator apparatus as described in claim 2 wherein said predetermined number of arithmetic operations equals $2^{N+1}$ samples, where N is the number of bits of the particular A/D converter used.

6. A digital integrating/auto-correlator apparatus as described in claim 2 wherein said arithmetic logic means performs a 2 N bit parallel ADD or Subtract, where N is the number of bits of the particular A/D converter used.

7. A digital integrating/auto-correlator apparatus as described in claim 1 wherein said digital output signal comprises one group from the group of four bits, eight bits, ten bits, twelve bits, sixteen bits, or thirty two bits.

8. A digital integrating/auto-correlator apparatus as described in claim 1 wherein said digitally correlated output signal comprises one group from the group of four bits, eight bits, twelve bits, sixteen bits, or thirty two bits.

* * * * *